United States Patent [19]
Kimura et al.

[11] Patent Number: 6,048,092
[45] Date of Patent: Apr. 11, 2000

[54] NONCONTACTING THERMOMETER

[75] Inventors: Mitsuteru Kimura, Miyagi; Takeshi Kudo, Kanagawa, both of Japan

[73] Assignees: Terumo Kabushiki Kaisha, Tokyo; Mitsuteru Kimura, Miyagi-Ken, Japan

[21] Appl. No.: 08/826,796

[22] Filed: Mar. 25, 1997

[30] Foreign Application Priority Data

Mar. 26, 1996 [JP] Japan .................................. 8-070632

[51] Int. Cl.⁷ ...................................................... G01J 5/20
[52] U.S. Cl. ...................... 374/129; 250/338.1; 374/133; 374/170
[58] Field of Search ................................ 374/121, 129, 374/133, 170; 250/338.1, 176, 152

[56] References Cited

U.S. PATENT DOCUMENTS

| | | | |
|---|---|---|---|
| 2,442,823 | 6/1948 | Polye | 374/121 |
| 3,487,213 | 12/1969 | Horan et al. | |
| 3,612,535 | 10/1971 | Davis | 273/135 R |
| 3,672,221 | 6/1972 | Weil | 374/121 |
| 3,834,238 | 9/1974 | Mueller et al. | 73/362 R |
| 3,875,501 | 4/1975 | Hayashi | 374/170 |
| 4,125,023 | 11/1978 | Amemeiya et al. | 323/75 |
| 4,887,229 | 12/1989 | Weiss . | |
| 4,955,727 | 9/1990 | Weiss . | |
| 5,232,284 | 8/1993 | Egawa et al. | 374/133 |
| 5,246,292 | 9/1993 | Gal et al. . | |
| 5,614,716 | 3/1997 | Rupert et al. . | |

FOREIGN PATENT DOCUMENTS

| | | |
|---|---|---|
| 0250841 | 5/1987 | European Pat. Off. . |
| 0664554 A1 | 7/1995 | European Pat. Off. . |
| 52-46115 | 11/1977 | Japan . |
| 56-037728 | 4/1981 | Japan . |
| 63-033631 | 2/1988 | Japan . |
| 7-134066 | 5/1995 | Japan . |
| 7-280652 | 10/1995 | Japan . |
| 7-311085 | 11/1995 | Japan . |
| 8-201177 | 8/1996 | Japan . |

OTHER PUBLICATIONS

Proceedings of the Nuclear Science Symposium and Medical Imaging Conference, Santa Fe, Nov. 2–9, 1991, vol. 2 of 3, Nov. 2, 1991, Institute of Electrical and Electronics Engineers, pp. 1169–1172, XP000348017 Devlin M., et al: "A DC–Coupled, High Sensitivity Bolometric Detector System for the Infrared Telescope in Space."

*Primary Examiner*—Christopher W. Fulton
*Assistant Examiner*—Maria Fernandez
*Attorney, Agent, or Firm*—Burns, Doane, Swecker & Mathis, LLP

[57] ABSTRACT

This invention concerns a noncontacting type thermometer which is improved in sensitivity of detection and accuracy of measurement and meanwhile adapted to prevent a thermistor element itself from self-generation of heat. A pulse voltage generating circuit 15 generates a pulse voltage of a rectangular waveform having a pulse wave height, a pulse width, and a pulse cycle enough to render negligible the effects of the self-generation of heat of a thermistor bolometer element in accordance with the thermal capacity of the thermistor bolometer. A detecting circuit 20 admits the pulse voltage, generates a differential voltage arising from a change in the magnitude of resistance corresponding to the amount of an incident infrared radiation of an infrared radiation detecting thermistor bolometer element RA, and amplifies this differential voltage by means of a differential amplifier 24. A voltage adding circuit 30 admits a pulse voltage generated from the differential amplifier 24 synchronously with the pulse cycle of the pulse voltage generated from the pulse voltage generating circuit 15 and adds a prescribed number of pulses of the pulse voltage to produce an ultimate measured voltage.

15 Claims, 4 Drawing Sheets

NONCONTACTING THERMOMETER

BACKGROUND OF THE INVENTION

1. Field of the Invention

This invention relates to a noncontacting thermometer which is capable of measuring the temperature of an object without requiring contact therewith.

2. Description of the Prior Art

Heretofore, the temperature detecting device using an infrared sensor for a temperature sensing part thereof has measured the temperature of an object by utilizing the fact that when the infrared radiation from the object impinges on and heats the temperature sensing part, the consequent rise of the temperature thereof induces a proportionate change in the output of the infrared sensor.

Various proposals aimed at miniaturizing such thermal type infrared sensors and conferring exalted sensitivity thereon have been made (as disclosed in JP-A-63-273,024, for example). In the case of objects which commonly have temperatures near or below room temperature, the infrared radiations therefrom which impinge on the infrared sensor are very feeble. When a thermistor type infrared sensor is used instead by way of compensation, it calls for various contrivances such as exalting thermistor constant, diminishing thermal capacity, and precluding diffusion of the thermal energy arising from the infrared radiation to the fullest possible extent.

One of the contrivances developed to date for lowering the thermal capacity of an infrared sensor is a noncontacting semiconductor temperature sensor which, as disclosed in JP-A-63-273,024, is composed of a substrate provided with an opening, a sensor part provided with a resistance film formed by diffusing an impurity in a polycrystalline silicon film, and a metal bridge for supporting the sensor part in a suspended state inside the opening relative to the substrate.

Incidentally, the thermistor type infrared sensor is adapted to detect a rise of the temperature of a thermistor element due to the incidence of an infrared radiation in terms of a change in the electric resistance of the thermistor element. The attempt to lower the thermal capacity by having the sensor part suspended as contemplated by the conventional technique indeed permits exaltation of sensitivity. It nevertheless results in rendering the thermistor element itself susceptible of generation of heat by the voltage (electric current), namely Joule heat, to be applied for the determination of thermistor resistance. It is suspected that this fact will rather have an adverse effect on the accuracy of measurement.

In the case of a temperature detecting device which is composed of two thermistor elements, one for the temperature compensation and the other for the detection of an infrared radiation, when a large voltage is applied for the purpose of enhancing sensitivity, the self-evolution of heat proceeds excessively and the two thermistor elements produce a temperature difference such that they affect each other's temperature. It is, therefore, suspected that the heating of the thermistor elements themselves produces an adverse effect on the accuracy of determination.

For the prevention of this adverse effect, adoption of a method for lowering the voltage applied to the thermistor elements to the fullest possible extent may be conceived. This method, however, is at a disadvantage in rendering impartation of fully satisfactory sensitivity difficult because the output voltage of thermistor element is proportional to the applied voltage and a decrease made in the applied voltage to lower the amount of generated heat to a negligible degree inevitably entails a proportionate decrease in the output voltage.

SUMMARY OF THE INVENTION

This invention has been produced for the purpose of solving both the contradictory problems suffered by the prior art as mentioned above. It aims to provide a noncontacting type thermometer which is improved in sensitivity of detection and accuracy of measurement and meanwhile adapted to prevent the infrared detecting element itself from self-evolution of heat.

The invention concerns a noncontacting type thermometer characterized by comprising pulse voltage output means for generating a voltage in a pulsating form, infrared radiation detecting means for generating a pulsating voltage conforming in magnitude to the amount of infrared radiation incident correspondingly to the temperature of an object for measurement in response to the output voltage of the pulse voltage output means, and adding means for adding the pulsating voltage generated from the infrared radiation detecting means.

In the construction described above, since the infrared radiation detecting means receives application of a pulsating voltage, the amount of self-generated heat thereof per unit time can be decreased as compared with the constant application of voltage. Since the pulsating voltage generated from the infrared radiation detecting means is added by adding means, the accuracy of measurement can be obtained as expected in spite of a feeble voltage derived from one pulse by setting the number of pulses to be added at its optimum. The term "amount of infrared radiation" as used herein means a numerical value to be determined by the intensity of a relevant infrared radiation, the area of incidence of the radiation, etc.

The invention concerns the noncontacting type thermometer, wherein the pulse voltage output means generates, in accordance with the thermal time constant of the infrared radiation detecting means, a pulse voltage of a rectangular waveform having a pulse wave height, a pulse width, and a pulse cycle enough to render negligible the effects of the self-generation of heat of the infrared radiation detecting means.

The application of the pulse voltage of a rectangular waveform having such pulse wave height, pulse width, and pulse cycle as mentioned above to the infrared radiation detecting means results in improving the sensitivity of detection because it deprives the infrared radiation detecting means of the effects of its self-generation of heat (Joule heating).

The invention concerns the noncontacting type thermometer, wherein the infrared radiation detecting means comprises a detecting circuit formed by the series connection of an infrared radiation detecting element for varying the magnitude of resistance of its own by sensing the magnitude of infrared radiation incident at least correspondingly to the temperature of an object under measurement with a resistor and amplifying means for amplifying the voltage at a point between the infrared radiation detecting element and the resister in the detecting circuit and the pulse voltage output means is connected to the detecting circuit.

The invention concerns the noncontacting type thermometer, wherein the infrared radiation detecting means comprises a detecting circuit forming an impedance bridge with a first circuit formed by the series connection of an infrared radiation detecting element for varying the magnitude of resistance of its own by sensing the magnitude of infrared radiation incident at least correspondingly to the temperature of an object under measurement with a resistor and a second circuit formed by the series connection of resistors and connected parallelly to the first circuit and amplifying means for amplifying the potential difference between a point intervening between the infrared radiation detecting element and the resistor of the first circuit and a point intervening between the resistors of the second circuit in the detecting circuit and the pulse voltage output means is connected to the input terminal of the impedance bridge.

The construction causes the pulsating voltage generated from the detecting circuit to be amplified by the amplifying means and consequently enables the wave height of the pulse generated from the pulse voltage output means to be lowered by a size equivalent to the ratio of amplification of the amplifying means, the effects of the self-generation of heat diminished proportionately, and the sensitivity of detection to be enhanced where the accuracy of measurement is fixed.

The invention is characterized in that the first circuit in the construction of the infrared radiation detecting means is formed by the series connection of two resistors and the second circuit in the same construction is formed by the series connection of an infrared radiation detecting element for the detection of infrared radiation and an infrared radiation detecting element for the temperature compensation.

The invention concerns the noncontacting type thermometer, wherein the infrared radiation detecting element is a thermistor.

The invention concerns the noncontacting type thermometer, wherein the infrared radiation detecting means is possessed of a cavity part and provided with a temperature sensing part using a thin film thermistor element formed over the cavity part.

This construction enables the thermal capacity of the infrared radiation detecting element to be decreased and the sensitivity of detection to be improved.

The invention concerns the noncontacting type thermometer, wherein the resistor is a temperature compensating element formed of a thermistor.

The invention concerns the noncontacting type thermometer, wherein the pulse voltage output means generates a pulse voltage of a pulse width amply shorter than the thermal time constant of the infrared radiation detecting element.

The adoption of the pulse voltage of such a pulse width as mentioned above enables the infrared radiation detecting element to be deprived of self-generation of heat and permits the sensitivity of detection to be improved.

The invention concerns the noncontacting type thermometer, wherein the adding means adds a prescribed number of pulses of a pulsating voltage generated from the infrared radiation detecting means.

The addition of pulses which is performed as described above permits production of an output voltage that conforms to the relevant number of pulses and, therefore, enables the wave height and the width of pulses generated from the infrared radiation detecting means to be reduced, the pulse cycle to be elongated, the amount of self-generated heat of the infrared radiation detecting means to be decreased, and the sensitivity of detection to be enhanced.

The invention concerns the noncontacting type thermometer, wherein the adding means admits only a pulsating output voltage generated from the amplifying means as synchronized with the output pulse from the pulse voltage output means and adds a prescribed number of pulses of the admitted output voltage.

The concurrence attained as described above between the output timing of pulses generated from the pulse voltage output means and the input timing of pulses admitted by the adding mean allows the addition of voltage to be carried out efficiently and permits elimination of noise which is out of synchronism. It, therefore, results in enhancing the accuracy of measurement.

DETAILED DESCRIPTION OF THE INVENTION

This invention will be outlined first in preparation for the detailed description to be given below.

The infrared radiation detecting element for use in this invention does not need to be limited to a thermal type sensor. In the following detailed description, however, cases of using thermistor bolometer elements as infrared radiation detecting elements will be chiefly cited.

When thermistor bolometer elements are used as infrared radiation detecting elements, the effects of the self-generation of heat which have confronted the prior art as a problem are alleviated to a negligible degree by applying the voltage (pulse voltage) for a duration amply shorter than the thermal time constant of the thermistor bolometer element instead of lowering the magnitude of the applied voltage for the purpose of reducing the amount of self-generation of heat due to the voltage (or current) applied to the thermistor bolometer element.

Specifically, this invention has originated in a theory that the measurement of the impedance of a thermistor bolometer element does not necessitate application of static voltage (or current) but only requires instantaneous application of voltage and execution of an appropriate measure such as sampling or peak holding within the width of time of a relevant pulse and further in a theory that use of a plurality of pulses for application permits derivation of an output voltage from each of the pulses and electrical addition of the output voltages ought to result in producing a large output voltage and enhancing sensitivity.

These theories apply not only to thermistor bolometer elements which serve as infrared radiation detecting elements but also to all the elements that require application of voltage for the measurement of the resistance of their own.

Now, the first embodiment of this invention will be described in detail below with reference to the drawings.

Figure 1:
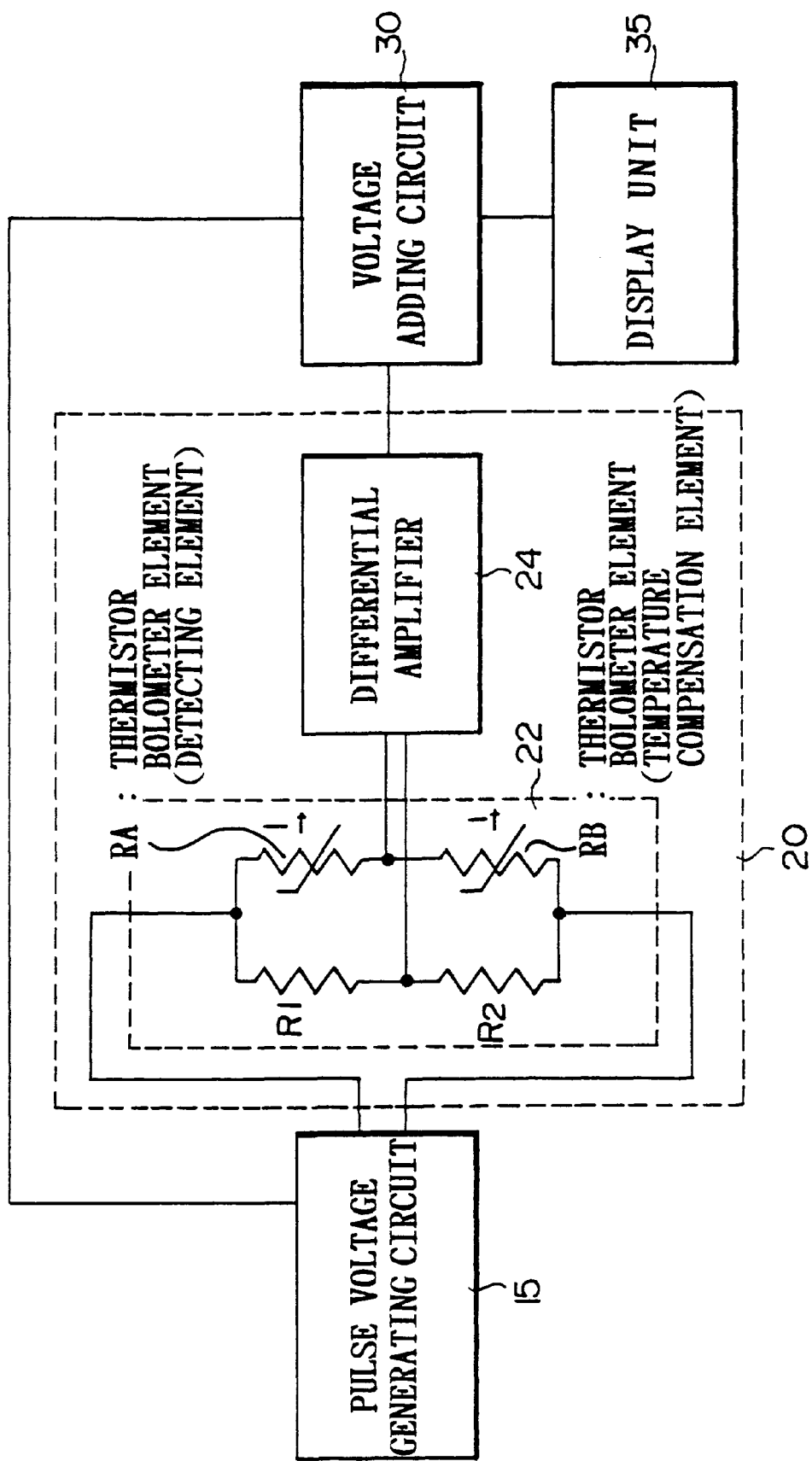
FIG. 1 is a block diagram illustrating schematically the construction of the noncontacting type thermometer according to this invention.

FIG. 1 is a block diagram schematically illustrating the construction of the noncontacting type thermometer of this invention.

Figure 3:
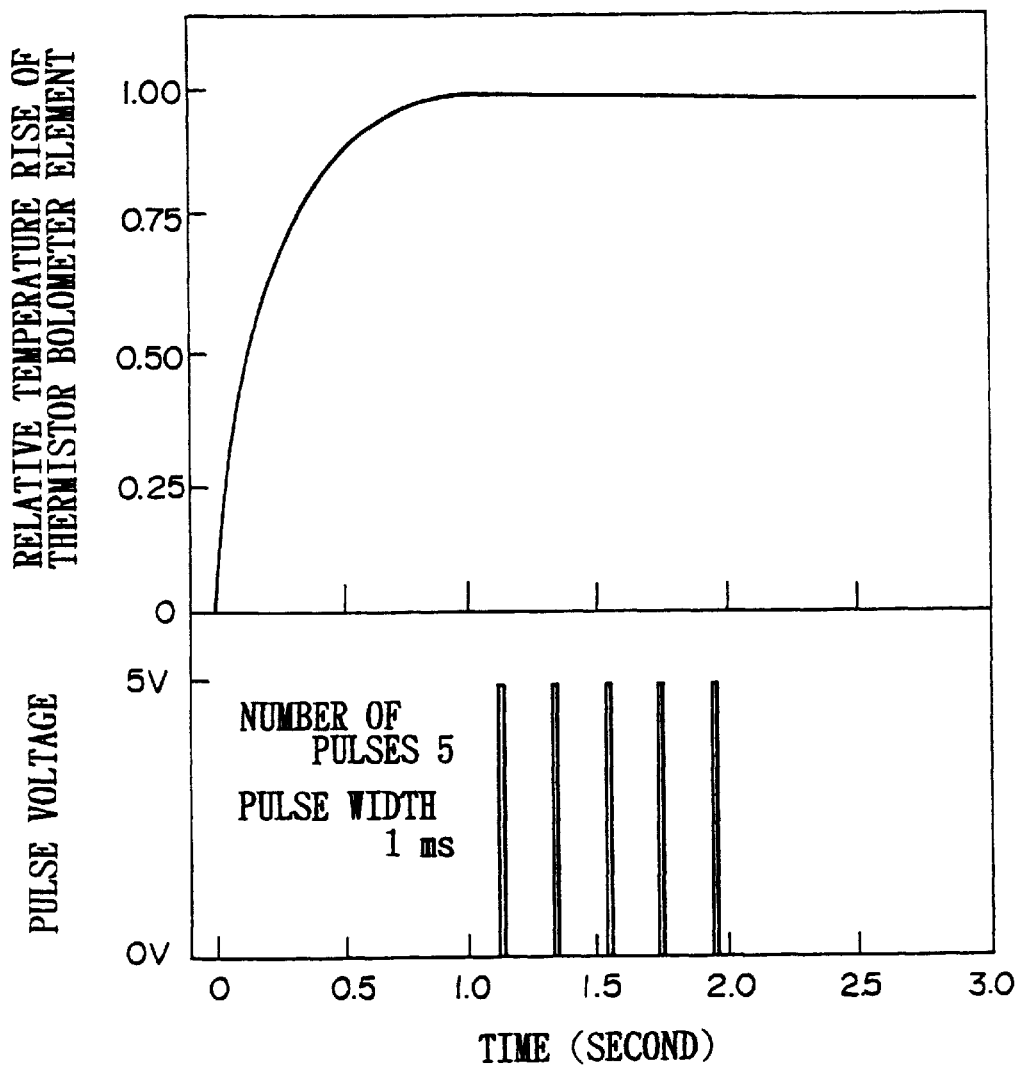
FIG. 3 is a diagram representing a time-course change of the temperature of a thermistor bolometer element for the detection of infrared radiation (relative elevation of temperature) and the pulse voltage applied to the thermistor bolometer element.

A pulse voltage generating circuit 15 shown in the diagram serves the purpose of generating such a pulsating voltage as shown in FIG. 3 and functions as pulse voltage output means. This pulse voltage generating circuit 15 is adapted to generate, in conformity to the thermal capacity of a thermistor bolometer element which will be specifically described afterward, a pulse voltage of a rectangular waveform having a pulse wave height, a pulse width, and a pulse cycle enough to render negligible the effects of the self-generation of heat of the thermistor bolometer element. Particularly, the pulse width is amply shorter than the thermal times constant of the thermistor bolometer element.

The pulsating voltage which is generated from this pulse voltage generating circuit 15 is injected into infrared radiation detecting means 20 which generates a pulsating voltage conforming in magnitude to the amount of infrared radiation incident correspondingly to the temperature of an object for measurement. The infrared radiation detecting means 20 is composed of a detecting circuit 22 and a differential amplifying device 24.

The detecting circuit 22, as illustrated in the diagram, forms an impedance bridge in which a first circuit obtained by the series connection of a thermistor bolometer element RA for detecting infrared radiation (detecting element) and a thermistor bolometer element RB for detecting ambient temperature and effecting temperature compensation (compensating element) and a second circuit obtained by the series connection of a resistor R1 and a resistor R2 are parallelly connected.

The differential amplifier 24 is connected to the contacting point between the resistor R1 and the resistor R2 and to the contacting point between the thermistor bolometer element RA (detecting element) and the thermistor bolometer element RB (compensating element) and intended to amplify the potential difference between the two contacting points and generate the outcome of amplification. The potential difference which arises between these two contacting points manifests a pulsating variation because the pulse voltage generating circuit 15 applies a pulsating voltage to the detecting circuit 22. The differential amplifier 24, therefore, is fated to amplify a potential difference which is varying in a pulsating form.

Incidentally, the two resistors R1 and R2 mentioned above are stationary resistors having a small temperature coefficient and the magnitudes of resistance thereof are set in conformity with the magnitudes of resistance of the thermistor bolometer element RA (detecting element) and the thermistor bolometer element RB for detecting ambient temperature and effecting temperature compensation (compensating element) so that the impedance bridge may assume an equilibrated state at the standard temperature (room temperature).

Figure 2:
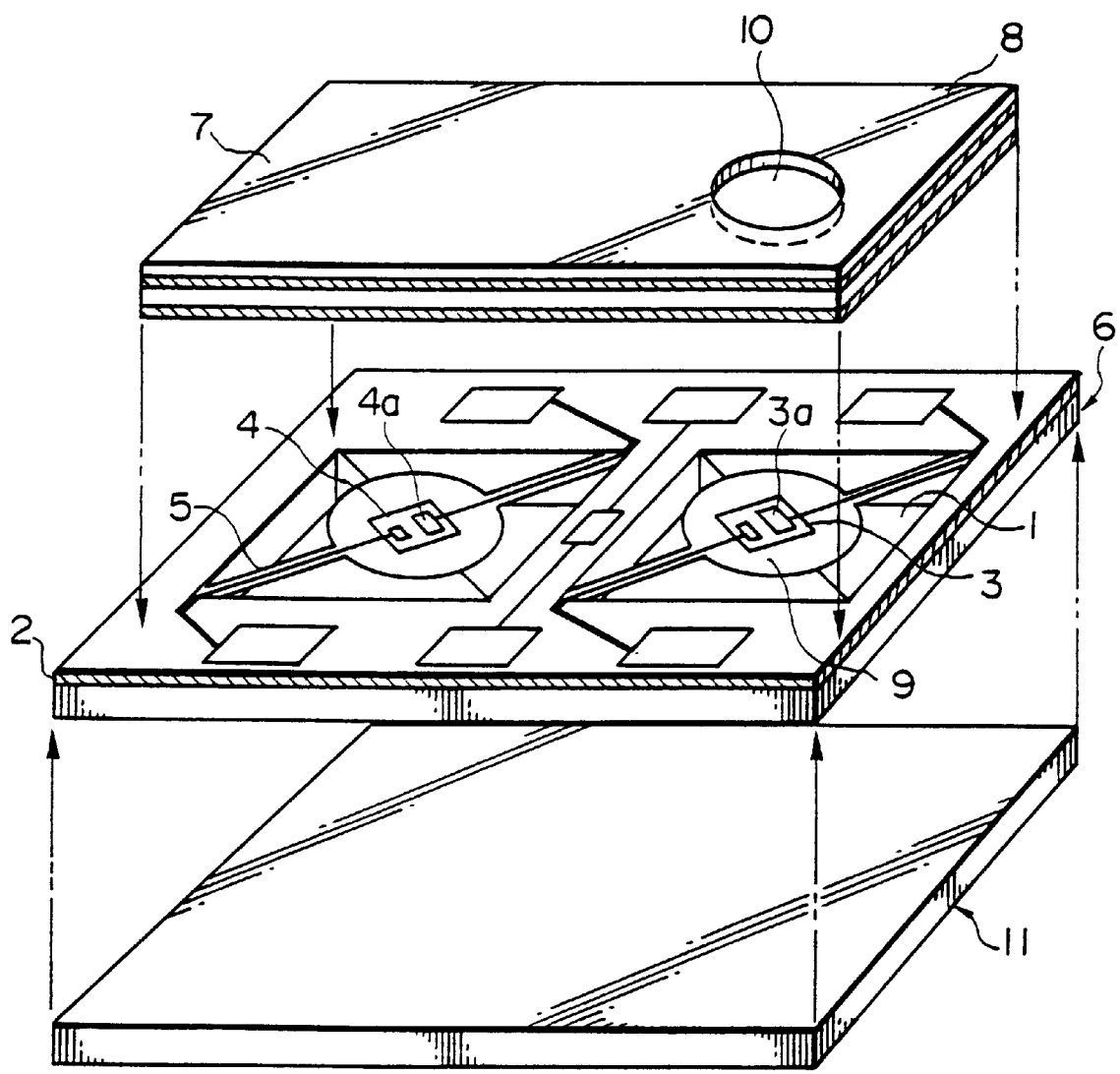
FIG. 2 is a schematic diagram of a set of thermistor bolometer elements formed in bridge constructions identical in shape.

The thermistor bolometer elements RA and RB, as illustrated in FIG. 2, are each possessed of a cavity part 1 and provided in an insulating thin film part 9 formed over the cavity part 1 with temperature sensing parts 3 and 4 using thin film thermistor elements made of a thin film semiconductor material. For the purpose of reducing the thermal capacity of the temperature sensing parts 3 and 4 and, at the same time, minimizing the amount of heat thereof to be diffused through supporting beams 5 to sensor substrates 6, the temperature sensing parts 3 and 4 having a large width (600 mm in diameter) are suspended with the supporting beams 5 having a small thickness (4 mm in thickness) and small widths (10 mm and 20 mm in width) to acquire a bridged construction.

An obverse cover 7 is joined to the upper surface of the thin film part 9 and an infrared radiation shielding film 8 is formed on the surface of the obverse cover 7. The infrared radiation shielding film 8 is provided at the position thereof opposite the temperature sensing part 3 with an incidence window 10 for admitting the infrared radiation from outside. To the lower surface of the sensor substrate 6 is joined a reverse cover 11.

Since the infrared radiation is allowed to impinge through the incidence window 10 upon the temperature sensing part 3, namely only one of the two temperature sensing parts 3 and 4, as described above, the thermistor bolometer element RA which is possessed of the temperature sensing part 3 functions as an element for detecting infrared radiation and the thermistor bolometer element RB which is possessed of the temperature sensing part 4 functions as a temperature compensating element.

A voltage adding circuit 30 serves the purpose of adding such a portion of the pulsating voltage generated from the differential amplifier 24 as equals a prescribed number of pulses. It starts admitting the pulses synchronously with the start of emission of pulses from a pulse voltage generating circuit 15. This synchronism is attained through the medium of a signal line interconnecting the pulse voltage generating circuit 15 and the voltage adding circuit 30.

A display unit 35 is adapted to convert the output voltage from the voltage adding circuit 30 to the corresponding magnitude of temperature and display the outcome of the conversion.

FIG. 3 is a model diagram representing the state of time-course change of the temperature of the temperature sensing part 3 of the infrared radiation detecting thermistor bolometer element RA, namely one of the thermistor bolometer elements shown in FIG. 1 and FIG. 2, and the pulse voltage of a rectangular waveform to be applied to this thermistor bolometer element RA.

The temperature increase by the Joule heat of either of the infrared radiation detecting thermistor bolometer element RA and the temperature compensating thermistor bolometer element RB could be diminished to a negligible degree by adjusting the magnitude of the pulse voltage and the pulse width of the voltage. According to the detecting circuit 22 which is depicted by way of example in the present embodiment, since the pulse current of a rectangular waveform flows by exactly the same timing also to the temperature compensating thermistor bolometer element RB notwithstanding a temperature increase, the effect of self-generation of heat produced therein by the Joule heat can be reduced to a negligible degree by deriving a differential output between the two elements.

Since the thermistor bolometer elements RA and RB depicted by way of example in the present embodiment have a thermal time constant of about one second as illustrated in FIG. 3, the pulse voltage generating circuit 15 is adapted to effect the application of the first one pulse voltage after the rise of temperature thereof is thoroughly saturated. The pulse voltage generating circuit 15, therefore, starts the output of pulse voltage after the elapse of not less than one second after the switch (not shown) of the thermometer, for example, is turned on. This arrangement is used because it permits extremely accurate measurement.

It has been customary to measure the output voltage of the detecting circuit 22 while the application of static voltage thereto is continued. In that case, a relatively low voltage (about 1V) is used in consideration of the self-generation of heat by the thermistor bolometer elements which are formed in a bridged construction. Since the output voltage of the detecting circuit 22 is proportional to the applied voltage, it is very difficult to obtain a voltage incapable of degrading the accuracy of measurement in the light of the aforementioned self-generation of heat as a contributory factor.

When the amount of self-generated heat of the thermistor bolometer elements and the resultant rise of temperature of the thermistor bolometer elements are determined by calculation, it is found as demonstrated below that they are too large to be ignored as compared with the accuracy of temperature (±0.01° C.) to be measured.

The thermal capacity, Cv, of the thermistor bolometer elements formed in a bridged construction as depicted by way of example in the present embodiment is found to be $3.59 \times 10^{-6}$ J/K based on the specific heat, density, and size of the material used therefor.

When a static voltage, V, applied to the thermistor bolometer elements is 1 (V), the amount of heat, Q, to be generated is found as $$Q = 1.43 \times 10^{-6} W$$

because $Q = V^2/R$ (wherein R represents the impedance of the thermistor bolometer element).

The rise of temperature, DT, due to the self-generation of heat of the thermistor bolometer element is thought to be found as $DT = Qt/Cv = 0.40$ K (wherein t represents time and assumes the thermal time constant of 1 second), with the escape of heat disregarded.

The disregard of the escape of heat herein is justified because the aforementioned thermistor bolometer element in the present embodiment is given the bridged construction in a vacuum as described above.

Since this invention uses the voltage for application in a pulsating form and applies this voltage only for a very short time, the net amount of heat to be generated can be reduced. Further, since the peak voltage in one pulse used in the present invention is higher than the static voltage of the conventional adoption, this invention attains a proportionately large output voltage.

Specifically, the pulse output voltage of the detecting circuit 22 is proportional to the voltage applied by the pulse voltage generating circuit 15 to the detecting circuit 22. When the output voltage of the pulse voltage generating circuit 15 is set at 5V, for example, the pulse output voltage of the detecting circuit 22 is 5 times that of the conventional equivalent using a relatively low voltage (1V) for application. Since the effects of the self-generation of heat are reduced as described above and the magnitude of the noise entering from the ambience is the same as before, the SN ratio (S/N) enjoys a fivefold increase (about 14 dB).

The voltage adding circuit 30 is adapted to add output voltages derived from a plurality of pulses and, therefore, is enabled to acquire an overall output voltage which is equivalent to the multiple of the number of pulses.

The pulse voltage of a rectangular waveform generated from the pulse voltage generating circuit 15 illustrated in FIG. 1 has a pulse wave height (peak voltage) of 5V and a pulse width of 1 ms as illustrated in FIG. 3. The pulse voltage generating circuit 15 generates the pulse voltage having such a wave height and a wave width as described above at a rate of 5 pulses per second and, therefore, has a pulse cycle of 200 ms.

Since the pulse voltage of the preceding description is applied to the thermistor bolometer elements, the increase, DT, of the temperature thereof is 0.00992 K, a value even less than 1/40 times the conventional value and smaller than the accuracy of measurement of temperature. As a result, this invention realizes a noncontacting type thermometer of high sensitivity capable of acquiring an overall output voltage 25 times the conventional level (about 28 dB).

By forming the thermistor bolometer element RA for the detection of infrared radiation and the thermistor bolometer element RB for the temperature compensation both in a perfectly identical shape, the temperature difference between these two elements can be lowered below $1 \times 10^{-4}$ K even when the application of a pulse voltage of a larger rectangular waveform induces the temperature due to the Joule heat (heat of self-generation) to rise by 0.4 K.

The overall output voltage in the noncontacting type thermometer of this invention, unlike that in the conventional equivalent using an integral network for the processing of signals, places absolutely no reliance on the width of the output pulse of the infrared radiation detecting circuit but attaches sole significance to the magnitude of the pulse voltage (peak voltage). This invention, therefore, can utilize a pulse voltage of an amply narrow width for the purpose of reducing the heat of self-generation of the infrared radiation detecting element.

The noncontacting type thermometer of this invention which is constructed as described above is fated to operate as follows.

Figure 4:
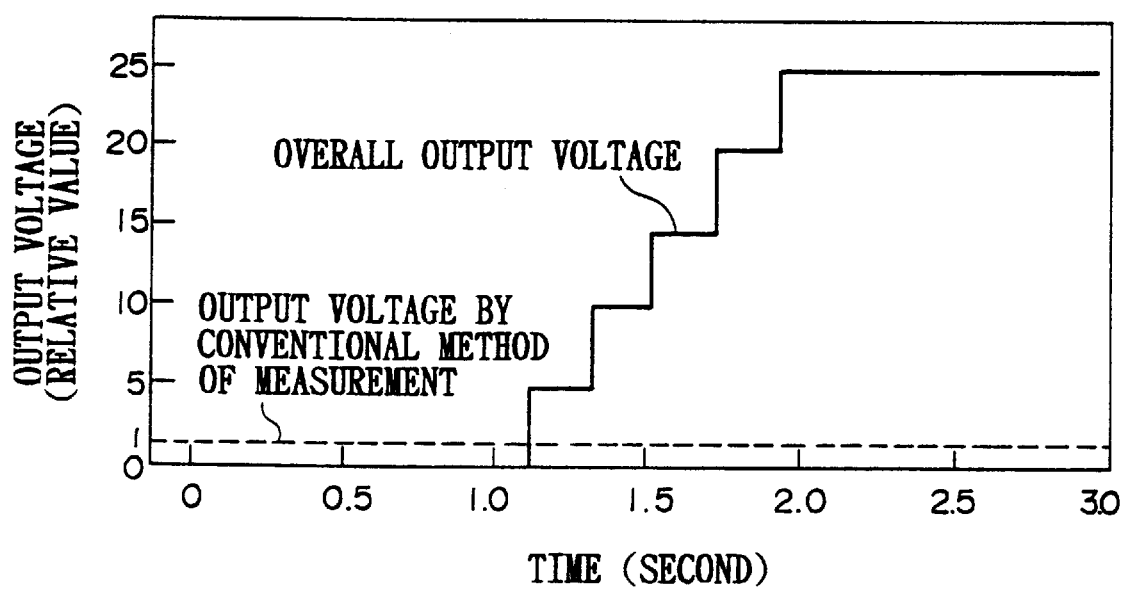
FIG. 4 is a diagram representing the time-course change of the overall output voltage as compared with the output voltage obtained by the conventional method of measurement (relative values).

First, when the noncontacting type thermometer of this invention is caused to face an object for measurement and turned on by a switch (not shown), it waits the rise of temperature of the thermistor bolometer element RA to saturate (in the matter of not less than 1 second in the present embodiment) and then prompts the pulse voltage output circuit 15 to generate a pulse voltage having such a pulse wave height, a pulse width, and a pulse cycle as shown in FIG. 3. The detecting circuit 20 admits this pulse voltage and generates a differential voltage arising from the change in the magnitude of resistance corresponding to the amount of infrared radiation impinging on the thermistor bolometer element RA or the detection of infrared radiation. This differential voltage is amplified by the differential amplifier 24. The voltage adding circuit 30 admits the pulse voltage generated from the differential amplifier 24 synchronously with the pulse cycle of the pulse voltage generated from the pulse voltage generating circuit 15, adds the portion of the pulse voltage which is equivalent to a prescribed number of pulses as shown in FIG. 4, and obtains an ultimate voltage for measurement. The display unit 35 receives this voltage for measurement and displays the temperature which corresponds to this voltage.

The one example of the mode of effecting this embodiment described above is intended solely for the illustration of this invention and is not meant to limit this invention. To the following modes, therefore, the present invention can be applied.

Since the pulse wave height (peak voltage) is such as to permit application of a voltage several times as high as the static voltage used conventional, one pulse suffices to effect one measurement in the application for which sensitivity several times as high as the conventional level proves sufficient.

When the differential amplifier and the voltage adding circuit to be used are rated for a higher speed of operation, the pulse width can be further decreased and the heat of self-generation of the thermistor bolometer elements due to the application of voltage can be proportionately reduced.

The detecting circuit 22 in the example cited above is depicted as one to be driven at a static voltage. Even when it is adapted to be driven at a static current, this invention can be embodied without any alteration of the gist thereof.

Further, even in the noncontacting type thermometer of this invention, the thermistor bolometer elements for both the detection of radiant ray (for infrared radiation detection) and the temperature compensation (for temperature compensation) are enabled to acquire as high sensitivity as is attainable by the conventional technique when they are packaged in a vacuum so as to allay the possible diffusion of the heat from the temperature sensing part to the ambient air through heat conduction.

In the mode of the present embodiment, the thermistor bolometer elements are depicted each as forming a Wheatstone bridge. The resistors R1 and R2 each do not need to be limited to a stationary resistor but may incorporate an inductance or capacitance element therein and consequently form an impedance bridge containing the element. Since the impedance bridge is capable of phase adjustment, it permits the pulse width to be reduced.

Further, R1 and R2 may be thermistors as well. R1 and R2 may be thermistors which are formed on the sensor substrate 6. RA may be constructed by adding resistance to the thermistor.

The infrared radiation detecting elements tolerate an addition to the heat of self-generation so long as the addition can be cancelled in terms of circuitry. If the cancellation is not attained in terms of circuitry, it may be diminished to a negligible degree by being subtracted from the output voltage because the effects of the self-generation of heat are known.

In the description given above, the infrared radiation detecting elements have been depicted mainly with respect to cases using thermistor bolometers. It should be noted, however, that the infrared radiation detecting elements do not need to be limited to these cases.

Even when the infrared radiation detecting elements are the elements of Schottky barrier diodes or photodiodes, the changes in impedance which arise in consequence of the incidence of infrared radiation on these elements can be detected by the application of a reverse bias to the elements. When Schottky barrier diodes or photodiodes are used (in such a manner as to permit application of a reverse bias) in the parts formed with thermistor bolometers in the embodiment, therefore, this invention can be embodied without any alteration of the gist thereof.

The entire disclosure of Japanese Patent Application No. 8-70632 filed on Mar. 26, 1996 including specification, claims, drawings and summary are incorporated herein by reference in its entirety.

What is claimed is:

1. A noncontacting type thermometer comprising:

pulse voltage output means for generating a voltage in a pulsating form;

infrared radiation detecting means for generating a pulsating voltage conforming in magnitude to the amount of infrared radiation incident corresponding to the temperature of an object for measurement in response to the output voltage of said pulse voltage output means;

amplifying means for amplifying the pulsating voltage generated from said infrared radiation detecting means; and adding means for adding the pulsating voltage generated from said amplifying means, wherein said adding means admits the pulsating voltage generated from said amplifying means as synchronized with the output timing of the pulsating voltage generated from the pulse voltage output means and adds a prescribed number of pulses of the admitted voltage.

2. A noncontacting type thermometer according to claim 1, wherein said pulse voltage output means generates, in accordance with the thermal time constant of said infrared radiation detecting means, a pulse voltage of a rectangular waveform having a pulse wave height, a pulse width, and a pulse cycle enough to render negligible the effects of the self-generation of heat of said infrared radiation detecting means.

3. A noncontacting type thermometer according to claim 2, wherein said pulse voltage output means generates a pulse voltage of a pulse width amply shorter than the thermal time constant of said infrared radiation detecting means.

4. A noncontacting type thermometer according to claim 1, wherein said infrared radiation detecting means comprises a detecting circuit formed by at least the series connection of an infrared radiation detecting element for varying the magnitude of resistance of its own by sensing the magnitude of infrared radiation incident corresponding to the temperature of an object under measurement with a resistor, wherein said amplifying means amplifies the voltage at a point between said infrared radiation detecting element and said resistor in said detecting circuit, and wherein said pulse voltage output means is connected to said detecting circuit.

5. A noncontacting type thermometer according to claim 4, wherein said infrared radiation detecting element is a thermistor.

6. A noncontacting type thermometer according to claim 4, wherein said infrared radiation detecting means includes a cavity part and wherein a temperature sensing part using a thin film thermistor element is formed on said cavity part.

7. A noncontacting type thermometer according to claim 4, wherein said resistor is a temperature compensating element formed of a thermistor.

8. A noncontacting type thermometer according to claim 4, wherein said pulse voltage output means generates a pulse voltage of a pulse width amply shorter than the thermal time constant of said infrared radiation detecting means.

9. A noncontacting type thermometer according to claim 8, wherein said pulse voltage output means generates a pulse voltage of a pulse width amply shorter than the thermal time constant of said infrared radiation detecting means.

10. A noncontacting type thermometer according to claim 1, wherein said infrared radiation detecting means comprises a detecting circuit forming an impedance bridge with a first circuit formed by at least the series connection of an infrared radiation detecting element for varying the magnitude of resistance of its own by sensing the magnitude of infrared radiation incident corresponding to the temperature of an object under measurement with a resistor, and a second circuit formed by the series connection of resistors and connected in parallel to said first circuit, wherein said amplifying means amplifies the potential difference between a point intervening between said infrared radiation detecting element and said resistor of said first circuit and a point intervening between said resistors of said second circuit in said detecting circuit, and wherein said pulse voltage output means is connected to the input terminal of said impedance bridge.

11. A noncontacting type thermometer according to claim 10, wherein said infrared radiation detecting element is a thermistor.

12. A noncontacting type thermometer according to claim 10, wherein said infrared radiation detecting means includes a cavity part and wherein a temperature sensing part using a thin film thermistor element is formed on said cavity part.

13. A noncontacting type thermometer according to claim 10, wherein said resistor is a temperature compensating element formed of a thermistor.

14. A noncontacting type thermometer according to claim 1, wherein said pulse voltage output means generates a pulse voltage of a pulse width amply shorter than the thermal time constant of said infrared radiation detecting means.

15. A noncontacting type thermometer according to claim 1, wherein said adding means adds a prescribed number of pulses of the pulsating voltage generated from said infrared radiation detecting means.

* * * * *

UNITED STATES PATENT AND TRADEMARK OFFICE
CERTIFICATE OF CORRECTION

PATENT NO. : 6,048,092          Page 1 of 1
DATED : April 11, 2000
INVENTOR(S) : Mitsuteru Kimura and Takeshi Kudo It is certified that error appears in the above-identified patent and that said Letters Patent is hereby corrected as shown below:

Column 10:
Line 30, replace "9" with -- 13 --;
Line 31, replace "8" with -- 9 --;
Line 34, replace "10" with -- 9 --;
Line 51, replace "11" with -- 10 --;
Line 52, replace "10" with -- 9 --;
Line 54, replace "12" with -- 11 --;
Line 55, replace "10" with -- 9 --;
Line 58, replace "13" with -- 12 --; and
Line 59, replace "10" with -- 9 --.

Signed and Sealed this

Twenty-eighth Day of August, 2001

*Attest:*

NICHOLAS P. GODICI
*Attesting Officer*     *Acting Director of the United States Patent and Trademark Office*